United States Patent [19]

Dahl

[11] 4,270,914
[45] Jun. 2, 1981

[54] PROCESS FOR CONTROLLING HEMICELLULOSE CONCENTRATION DURING THE MERCERIZATION OF CELLULOSE

[75] Inventor: Birger Dahl, Valaskjold, Norway

[73] Assignee: Borregaard Industries Limited, Sarpsborg, Norway

[21] Appl. No.: 88,576

[22] Filed: Oct. 26, 1979

[51] Int. Cl.³ .............................................. D06M 1/02
[52] U.S. Cl. ......................................... 8/125; 536/56; 536/60
[58] Field of Search ........................ 8/125; 536/56, 60

[56] References Cited

U.S. PATENT DOCUMENTS

| | | | |
|---|---|---|---|
| 3,600,379 | 8/1971 | Sihtola et al. | 536/60 |
| 3,728,330 | 4/1973 | Sihtola et al. | 536/60 |
| 4,151,207 | 4/1979 | Evju | 568/432 |

FOREIGN PATENT DOCUMENTS 7409374  1/1975  Netherlands.

OTHER PUBLICATIONS

H. Sihtola and L. Blomberg, Tappi, 1974, 57 (No. 7), pp. 73–75.

*Primary Examiner*—A. Lionel Clingman
*Attorney, Agent, or Firm*—Keil & Witherspoon

[57] ABSTRACT

The disadvantages stemming from a high content of hemicellulose in recirculated sodium hydroxide solutions used for the mercerization of cellulose in the preparation of viscose are reduced or eliminated by subjecting at least a part of the spent sodium hydroxide solution to an ultrafiltration process to remove part or all of the hemicellulose therein. The filtered sodium hydroxide liquor is supplied with make-up sodium hydroxide and is returned to the mercerization step.

4 Claims, 1 Drawing Figure

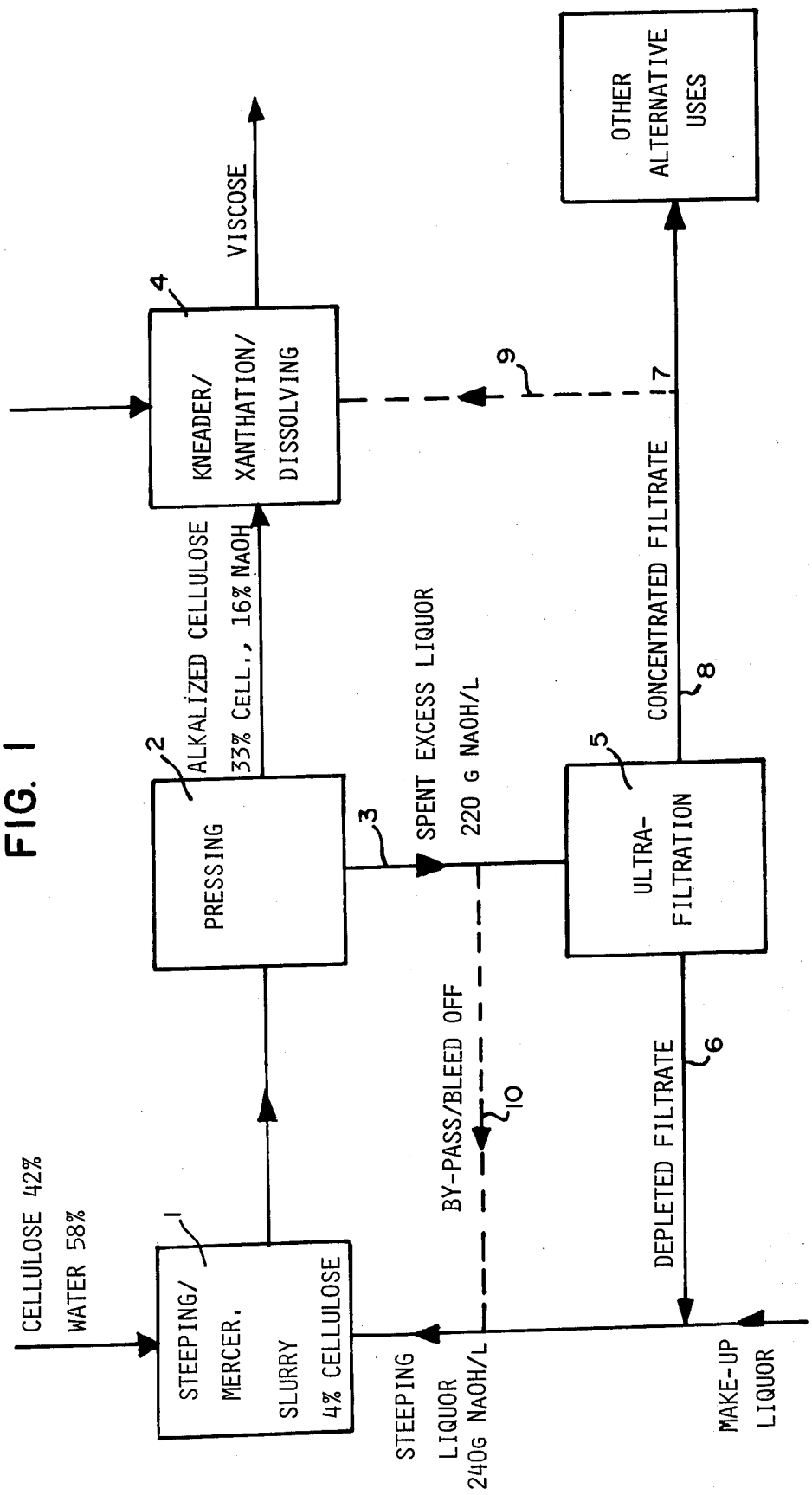

PROCESS FOR CONTROLLING HEMICELLULOSE CONCENTRATION DURING THE MERCERIZATION OF CELLULOSE

FIELD OF THE INVENTION

My invention relates to methods for mercerizing cellulose as the first step in the viscose process for producing rayon and other such cellulose derivative filaments.

BACKGROUND OF THE INVENTION

The manufacture of cellulose derivatives in general uses as a starting material a high purity cellulose having an α-cellulose content in the range of 90–97%. The term α-cellulose is broadly used to denote the fraction of the dissolving cellulose pulp which is insoluble in aqueous caustic alkali. The soluble fraction, which is called hemicellulose, comprises two main fractions, β- and γ-cellulose. The β-cellulose portion of the hemicellulose fraction may be precipitated by acidification (neutralization of the alkaline hemicellulose-containing solution), whereas the γ-cellulose will remain in solution under such a treatment. In general, hemicellulose consists of heterogeneous polymeric carbohydrates having a degree of polymerization in the range of 25–50.

The first step in the viscose process of making cellulose derivatives is the steeping/mercerizing of the dissolving cellulose pulp. The mercerization step comprises treating the cellulose with a strong alkaline solution usually containing more than 17%. A general account of the preparation of rayon (regenerated cellulose) is set forth at 17 *Kirk-Othmer Encyclopedia of Chemical Technology,* Rayon, 168–209 (2d ed. 1970); viscose preparation is discussed in detail in pages 175–180.

After the mercerization step the excess steeping liquid is pressed out of the alkalized cellulose, giving a spent liquor which is diluted with respect to sodium hydroxide and enriched with respect to hemicellulose. Since the hemicellulose fraction of the cellulose pulp starting material is dissolved in the strong caustic solution used in the steeping step, a low α-cellulose content pulp will produce an increased concentration of hemicellulose in the spent mercerization liquid.

After the pulp is converted to alkalized cellulose, it is shredded and aged by exposure to oxygen in the air, resulting in oxidative cleavage of the cellulose molecules to form shorter chains. After a proper period of aging, the alkalized cellulose is brought into contact with a proper amount of carbon disulfide, which converts the alkalized cellulose to cellulose xanthogenate which is soluble in a solution of sodium hydroxide and water.

Some of the spent excess mercerization liquor is normally used for dissolving the cellulose xanthogenate to form viscose, which is then spun into filaments or staple fibers. The major part of the spent liquor, however, is customarily adjusted in volume and sodium hydroxide concentration and is reused for the steeping/mercerization of a new cellulose pulp. In another words, part of the mercerization liquor is recirculated.

After a period of time, the concentration of hemicellulose in the recirculating mercerization liquor will reach an equilibrium which is determined by:

the hemicellulose (β- and γ- cellulose) content in the dissolving pulp;

the hemicellulose content of the alkalized cellulose; and the hemicellulose content of the spent liquor which is used for the subsequent dissolving of the cellulose xanthogenate.

An excess of hemicellulose in the recirculating mercerization liquor produces a number of disadvantages for the viscose process, which may be reduced or eliminated if the concentration of hemicellulose in the recirculating liquor can be decreased to an acceptable level.

It is well known that a high concentration of hemicellulose in the mercerizing liquor will increase the viscosity of the liquor and thus reduce the rate of penetration of the sodium hydroxide into the cellulose of the pulp, producing uneven mercerization and consequently a lower degree of substitution. This is described in a paper by I. Croon et al. in *Svensk Papperstidning* 1969 (No. 10) pages 336–38.

Increased viscosity in the mercerization liquor will also produce a lowering of the capacity of the presses used to expel excess liquor from the alkalized cellulose. In order to compensate for the reduced capacity of the presses, it is normal to increase the temperature during the mercerization step, which unfortunately increases the amount of hemicellulose extracted from the pulp. This is described in a paper by H. Brüning et al. in *Zellstoff und Papier,* 1964/8: 225–32. This paper also indicates that a high hemicellulose concentration in the mercerization liquor increases the solubility of the hemicellulose.

Another disadvantage discovered in the course of my own unpublished investigations with respect to raw pulp consumption is in accordance with these views, namely, that an increased content of hemicellulose in the alkalized cellulose makes it necessary to increase the amount of carbon disulfide used during xanthation in order to achieve the same level of quality viscose as is obtained when using a starting pulp material with a high α-cellulose content. High strength/modulus fibers cannot be prepared from cellulose materials having α-cellulose contents in the lower portion of the 90–97% range without simultaneously removing the hemicellulose that is dissolved in the recirculating spent mercerization liquor.

Accordingly, several methods have been devised in the prior art to reduce the hemicellulose content in the recirculated mercerization liquor. The Cerini process, the most well known presently available process, requires dilution of the spent liquor to approximately 6–8% before being subjected to continuous dialysis. As a result, it is necessary to concentrate the liquor by evaporation before it can be reused. At present, only a few viscose producers use this method, as it is relatively costly with respect to maintenance and energy consumption.

According to German Offlegungsschrift No. 24 33 235 and a paper by H. Sihtola et al. at *Tappi* 57: 73–75 (July 1974), hemicellulose in the recirculated mercerization liquor can be precipitated by the addition of ethanol or methanol. The precipitation agent must have a lower boiling point than that of water, so that the precipitation agent can be recovered by simple distillation. The precipitated mixture is separated by centrifugation or filtration, the centrifugate or filtrate then being distilled in order to recover the precipitating agent. The purified liquor may be reused for mercerization after being adjusted with respect to the sodium hydroxide concentration. This process is complicated and costly both with respect to the capital investment required and to production costs. The use of methanol and ethanol also poses environmental difficulties. So far as I know, this process has not been used on an industrial scale.

Of course, hemicellulose may also be removed by the conventional process of evaporating and reconstituting the mercerization liquor. This common process does not help with the γ-cellulose fraction of the mercerization liquor, however.

SUMMARY OF THE INVENTION

I have invented an improved method to reduce the hemicellulose concentration of the recirculated mercerization liquor. I accomplished this goal by continuously removing polymer carbohydrates from the recirculating mercerization liquor by submitting the same to ultrafiltration. The spent liquor is thus divided into two fractions, one depleted with respect to hemicellulose and one concentrated with respect to dissolved hemicellulose.

In particular, my invention relates to a continuous process for the mercerization of cellulose preparatory to making viscose, which comprises treating cellulose with a strong aqueous solution of sodium hydroxide, removing the excess liquor containing dissolved hemicellulose from the alkalized cellulose so produced, passing that excess liquor through ultrafiltration to remove all or part of the dissolved hemicellulose, and returning the portion of the sodium hydroxide liquor depleted of hemicellulose back to the original mercerization step and removing for other uses the ultrafiltrate portion which is high in hemicellulose content. The ultrafiltration may be carried out using an alkali-resistant membrane having a molecular weight separating limit of about 10,000. According to my invention, the hemicellulose content of the mercerization solution may be controlled by bleeding off a predetermined amount of the excess liquor before ultrafiltration has taken place and returning the measured amount of liquor to the original mercerization treatment step. The portion of the ultrafiltrate high in hemicellulose content produced in accordance with my invention may be used to dissolve cellulose xanthogenate further on in the viscose process.

The advantages of my invention are apparent, being simplicity of operation, low capital investment and production costs, easy availability of materials necessary to carry out the process and the efficient reuse of the entirety of the excess mercerization liquor. These features and other advantages of my invention will be apparent to persons skilled in this art from reading this specification and the claims appended hereto.

BRIEF DESCRIPTION OF THE DRAWING

FIG. 1 is a flow diagram of a viscose process system constructed in accordance with my invention.

DETAILED DESCRIPTION OF THE INVENTION

FIG. 1 is a simplified flow diagram illustrating my invention. Into 1 is introduced a cellulose slurry comprising 42% cellulose and 58% water. Simultaneously a steeping liquor comprising an aqueous solution of sodium hydroxide containing 240 g NaOH/l as well as some dissolved hemicellulose is introduced into 1. After the steeping/mercerization step the product is pressed at 2 and the alkalized cellulose produced thereby, containing 33% cellulose and 16% NaOH, is passed to step 4. The spent excess liquor withdrawn at 3 is then passed to ultrafiltration step 5. In the prior art processes, the amount of hemicellulose in the recirculating stream of liquor could be adjusted by varying the amount of liquor bled off and returned to the mercerization step 1 as a function of the volume of fresh steeping liquor supplied. Also in the prior art process a minor part of the spent liquor could also be diverted to step 4, into which the pressed alkali cellulose and carbon disulfide are introduced and in which the cellulose xanthogenate is formed and dissolved, forming the viscose which is further processed in a conventional manner.

The depleted filtrate 6 from the ultrafiltration step 5, which is low in hemicellulose content, is returned to the mercerization step after the addition of make-up liquor. The concentrated filtrate stream 7 is exhausted through a pipe line, denoted 8, and may either be used for dissolving the cellulose xanthogenate produced in step 4 by being forwarded through pipe 9 or may be diverted out of the system altogether for other alternative uses of the hemicellulose concentrate. It is of course possible to use a part of the depleted filtrate stream 6 for dissolving the cellulose xanthogenate in step 4 as well as the concentrated filtrate, if so desired.

The level of hemicellulose content of the steeping liquor recirculated to the mercerization step 1 may be determined by regulating the amount if any of spent excess liquor bled off through by pass line 10. This may be accomplished by conventional metering means or other means known to those skilled in this art.

The ultrafiltration process used according to my invention is described in U.S. Pat. No. 4,151,207, the disclosure of which is hereby incorporated by reference. That patent describes method in which spent sulfite liquor from paper making and the like can be enriched in high molecular weight fractions such as lignosulfonates so that the enriched fraction may be oxidized under alkaline conditions with molecular oxygen in the presence in a suitable catalyst in order to prepare vanillin (3-methoxy-4- hydroxybenzaldehyde). For the purposes of my invention, alkali-resistant membranes having a molecular weight separation limit of approximately 10,000 will remove a substantial part of the unwanted hemicellulose in the spent excess mercerization liquor. These membranes are available from De Danske Sukkerfabrikker, Denmark.

I illustrate my invention by the following examples in which ultrafiltration in accordance with my invention was applied to sheet mercerization and slurry mercerization processes respectively. The filtration unit was of the same general type described in U.S. Pat. No. 4,151,207, and the filtration members were of an alkali resistant type stated to have a molecular weight separation limit of approximately 10,000.

EXAMPLE 1—SHEET MERCERIZATION

Cellulose sheets having an α-cellulose content of 93.4% were dipped in a sodium hydroxide solution containing 19% by weight of NaOH and 10.7 g/l hemicellulose for 60 minutes at 25° C. after mercerization, the excess steeping liquor was pressed off and was determined to contain 14.4% by weight of NaOH, while the hemicellulose content had increased to 23.3 g/l. Approximately 80% of the spent liquor was subjected to ultrafiltration, and the depleted filtrate was combined with the remaining 20% of the spent liquor. This was admixed with an appropriate amount of make-up liquor (43% by weight NaOH) and water to give a final sodium hydroxide concentration of 19% by weight. The hemicellulose concentration of this made-up recirculated liquor was determined to be 10.7 g/l, which is the same as for the original mercerization liquor. This liquor was then reused in a new steeping process. The concentrated ultrafiltrate was determined to have a hemicellulose content of 42.4 g/l, and this liquor was used for dissolving cellulose xanthogenate in step 4 of FIG. 1. However, of course, other uses of this hemicellulose-enriched liquor are possible.

EXAMPLE 2—SLURRY MERCERIZATION

Dissolving quality cellulose containing 90% α-cellulose was continuously mercerized in the form of a slurry containing 4% cellulose and 96% aqueous caustic alkali solution containing 18% by weight NaOH and 46 g/l hemicellulose. The equilibrium concentration of hemicellulose in the steeping liquor was 46 g/l when the spent liquor was not submitted to ultrafiltration. However, by subjecting just 8% of this spent liquor to ultrafiltration, the equilibrium concentration could be reduced to 30 g/l. The concentrated filtrate stream from the ultrafiltration step was found to contain 76.3 g/l hemicellulose. In this case, as well, the concentrated filtrate was used to dissolve cellulose xanthogenate. In general, I have observed that the equilibrium concentration of hemicellulose in the mercerization liquor can be reduced to any desired level by subjecting a larger portion of the spent liquor than the 8% disclosed in this example to ultrafiltration.

The foregoing description of my invention has been directed to particular embodiments in accordance with the requirements of the Patent Act and for purposes of explanation and illustration. It will be apparent, however, to those skilled in this art that many modifications and changes may be made without departing from the scope and spirit of my invention. For example, it is apparent from the disclosure that modifications may be made which are necessary to satisfy the needs of any particular application, such as using different concentrations of NaOH, cellulose or hemicellulose, and which are within the state of the art. It is my intention in the following claims to cover all such modifications and variations, whether specifically set forth herein or not, as fall within the true scope and spirit of my invention.

What I claim as my invention is:

1. A continuous process for the mercerization of cellulose, comprising
    (a) treating cellulose with a strong aqueous solution of sodium hydroxide;
    (b) removing the excess liquor containing dissolved hemicellulose;
    (c) passing said liquor through ultrafiltration to remove all or part of the dissolved hemicellulose; and
    (d) returning the portion of the sodium hydroxide liquor depleted of dissolved hemicellulose to treatment step (a) and removing for other uses the ultrafiltrate portion which is high in hemicellulose content.

2. The process of claim 1, wherein the ultrafiltration is carried out using an alkali-resistant membrane having a molecular weight separating limit of about 10,000.

3. The process of claim 1 or 2, wherein the hemicellulose content of the treatment solution of step (a) is controlled by bleeding off a predetermined amount of said excess hemicellulose-containing liquor before step (c) without ultrafiltration and returning said liquor to treatment step (a).

4. The process of claim 1 or 2 wherein said ultrafiltrate high in hemicellulose content is used to dissolve cellulose xanthogenate in preparing viscose.

* * * * *